(12) United States Patent
Huff

(10) Patent No.: US 6,386,136 B1
(45) Date of Patent: May 14, 2002

(54) TEA KETTLE WHISTLE

(75) Inventor: Scott Huff, Chicago, IL (US)

(73) Assignee: Wilton Industries, Inc., Woodridge, IL (US)

( * ) Notice: Subject to any disclaimer, the term of this patent is extended or adjusted under 35 U.S.C. 154(b) by 0 days.

(21) Appl. No.: 09/562,884

(22) Filed: May 1, 2000

(51) Int. Cl.[7] .............................................. A47G 19/14
(52) U.S. Cl. ........................ 116/137 R; 116/70; 99/344
(58) Field of Search .......................... 116/137 R, 67 R, 116/70; 99/342, 344, 285

(56) References Cited

U.S. PATENT DOCUMENTS

| | | | | | |
|---|---|---|---|---|---|
| 1,161,713 A | * | 11/1915 | Madsen | ........................ | 116/70 |
| 2,630,113 A | * | 3/1953 | Zide | ........................ | 126/388.1 |
| 2,670,107 A | * | 2/1954 | Welden | ........................ | 222/474 |
| 4,466,327 A | * | 8/1984 | Hinton | ........................ | 84/95.2 |
| 5,441,039 A | * | 8/1995 | Yeh | ........................ | 126/388.1 |
| 5,588,567 A | * | 12/1996 | Yeh | ........................ | 222/475.1 |

* cited by examiner

Primary Examiner—Diego Gutierrez
Assistant Examiner—R. Alexander Smith
(74) Attorney, Agent, or Firm—Piper Marbury Rudnick and Wolfe

(57) ABSTRACT

A tea kettle whistle including three main parts comprising a whistle top and whistle base, both preferably formed of plastic, and a whistle insert, preferably formed of stainless steel. The insert is designed to be easily assembled with the top with no additional part being required to complete this assembly. The two plastic parts are assembled using a pin that also serves to hinge the parts together. The whistle base is provided with plastic O-rings which enable the assembly to be press fit within the spout in a fluid tight manner on a suitable adhesive compound may be employed to insure this relationship.

11 Claims, 4 Drawing Sheets

FIG.1
FIG.2
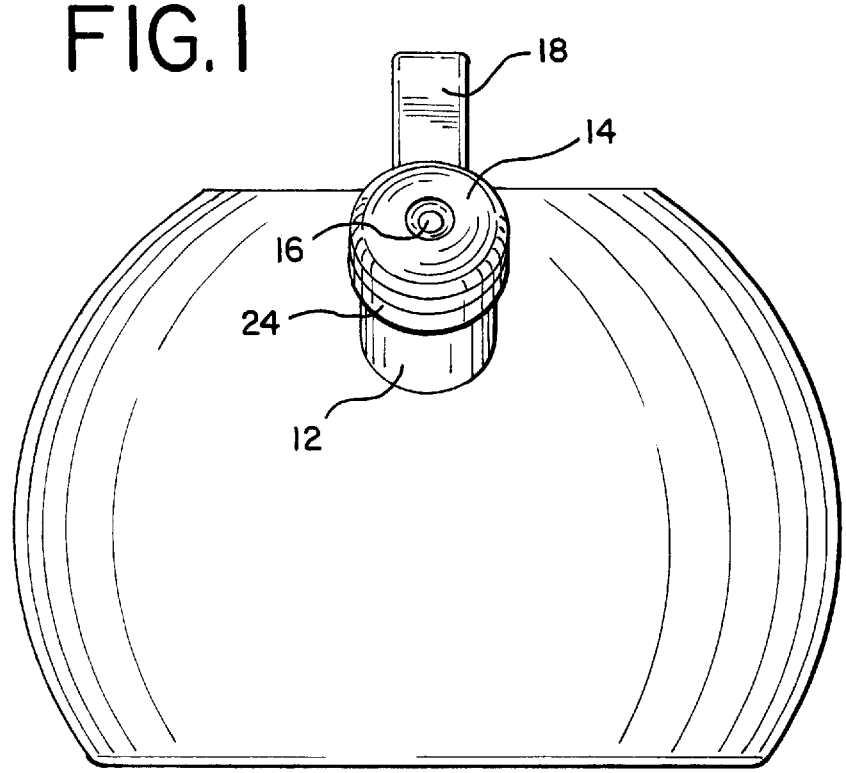
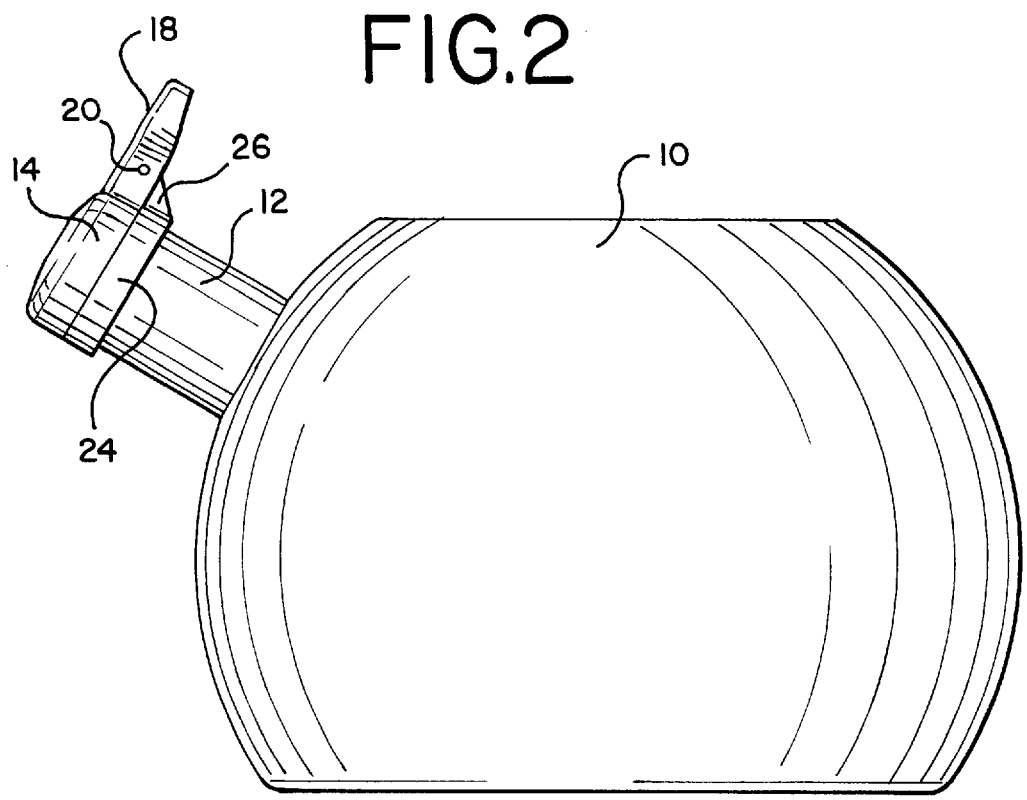

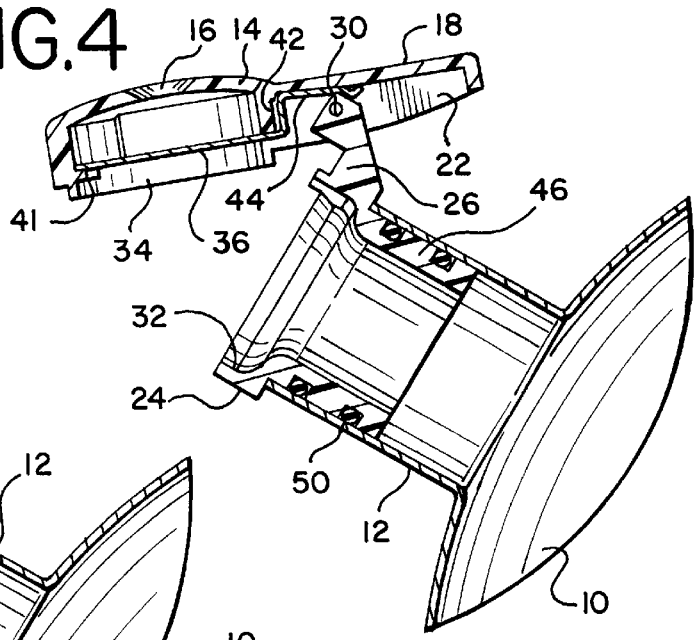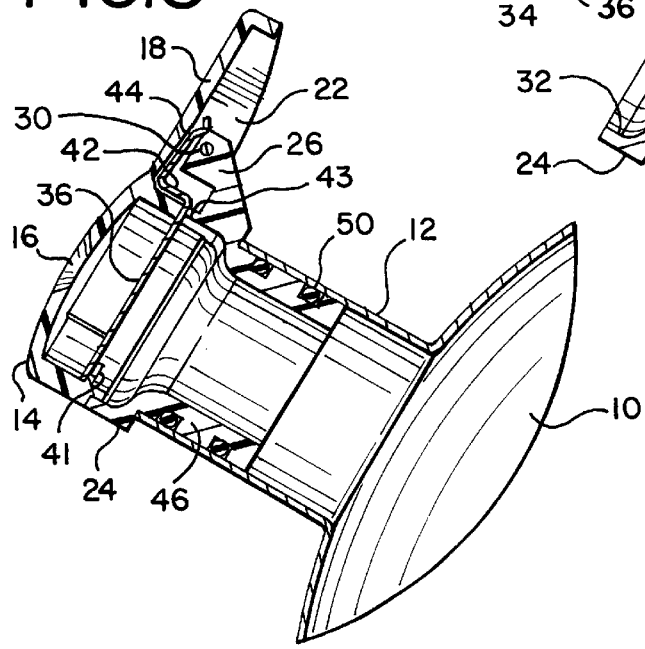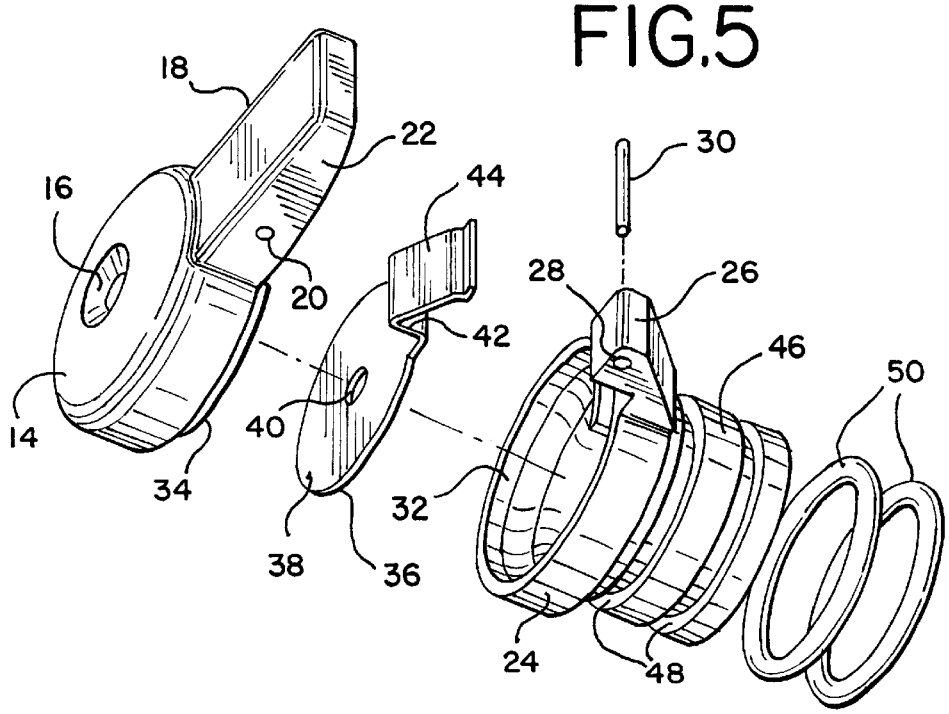

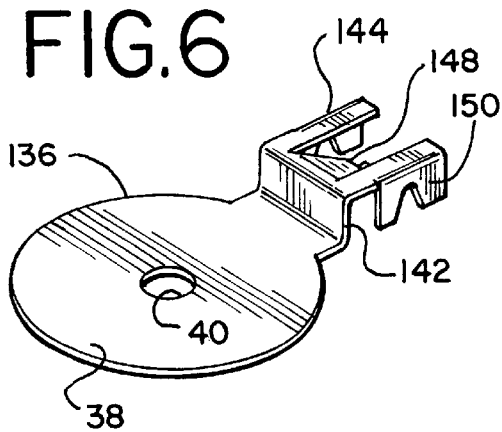
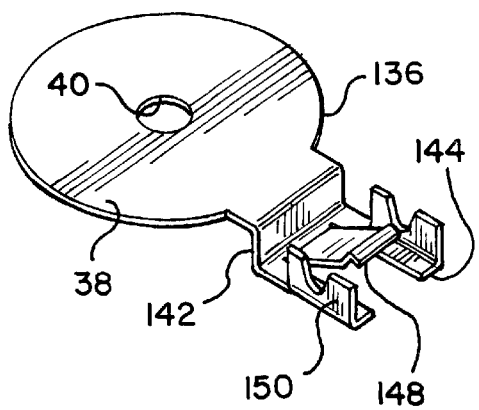
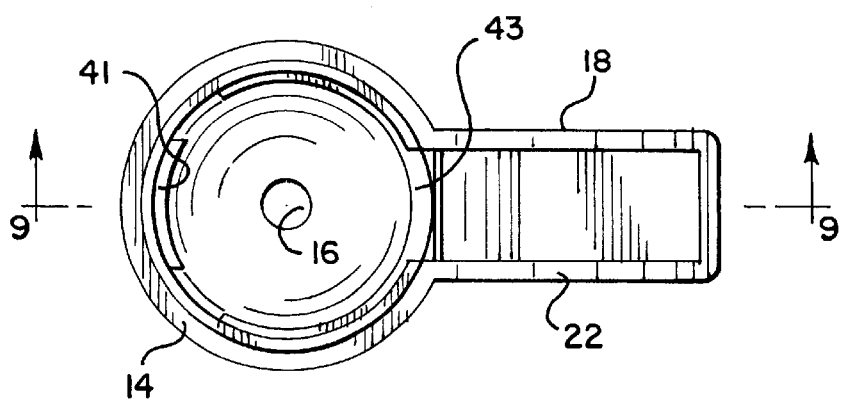
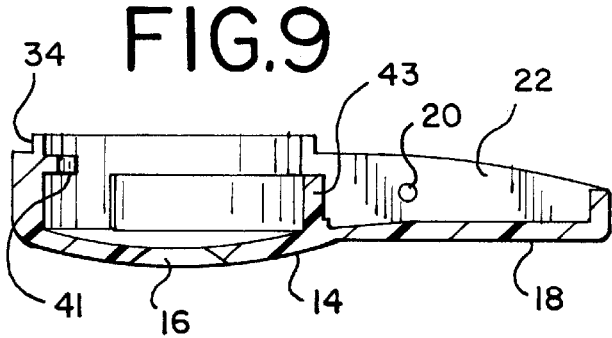
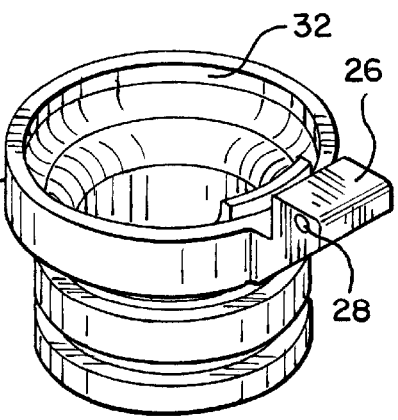

TEA KETTLE WHISTLE

BACKGROUND OF THE INVENTION

This invention relates to a whistle construction which is particularly adapted for association with a tea kettle. Whistles for tea kettles are very popular for both practical and aesthetic reasons. Thus, the whistle serves to alert the user that a correct temperature has been achieved for the making of tea. In addition there is a certain nostalgic enjoyment obtained when this familiar sound is recognized provided that the sound is not unpleasant.

For the foregoing reasons, a fair amount of design effort has been expended to make marketable tea kettle whistles. It has been recognized, however, that the best designs tend to be relatively complicated and therefore expensive to produce and assemble. Furthermore, prior designs employing a combination of plastic and metal parts have been assembled using screws. This type of design is unsatisfactory because, in addition to the relative difficulty of assembly, the screws tend to work loose as a result of the heat encountered in combination with the different coefficients of thermal expansion.

There is, therefore, a need for an inexpensive, uncomplicated tea kettle whistle design which is economical to produce, easy to assemble, has a reasonable useful life, and is still capable of providing the utilitarian and aesthetic features desired in such a construction.

SUMMARY OF THE INVENTION

The tea kettle whistle design of the invention includes only three main parts comprising the whistle top and whistle base, both preferably formed of plastic, and the whistle insert, preferably formed of stainless steel. The insert is designed to be assembled with the top by means of a simple operation with no additional part being required to complete this assembly. The two plastic parts are assembled using a pin that also serves to hinge the parts together. This also requires only a very simple assembly step and the nature of the parts is such that a secure assembly is achieved even under the operating conditions of a tea kettle.

When the parts have been assembled, they are easily associated with the tea kettle pouring spout in a secure fashion. Preferably, the whistle base is provided with plastic O-rings which enable the assembly to be press fit within the spout in a fluid tight manner. Alternatively, a suitable adhesive compound may be employed to insure this relationship.

BRIEF DESCRIPTION OF THE DRAWINGS

FIG. 1 is a front elevational view of a tea kettle having the whistle construction of the invention associated therewith;

FIG. 2 is a side elevational view of the tea kettle shown in FIG. 1;

FIG. 3 is an enlarged fragmentary cross-sectional view of the whistle construction of the invention with the top in the closed condition;

FIG. 4 is an enlarged fragmentary cross-sectional view of the whistle construction of the invention with the top in the open condition;

FIG. 5 is an exploded view illustrating the respective parts making up the whistle construction;

FIG. 6 is a top perspective view of an alternative form of whistle insert;

FIG. 7 is a bottom perspective view of the whistle insert of FIG. 6;

FIG. 8 is a bottom plan view of the whistle top;

FIG. 9 is a cross-sectional view of the whistle top taken about the line 9—9 of FIG. 8;

FIG. 10 is a perspective view of the whistle base;

DESCRIPTION OF THE PREFERRED EMBODIMENTS

Figure 11:
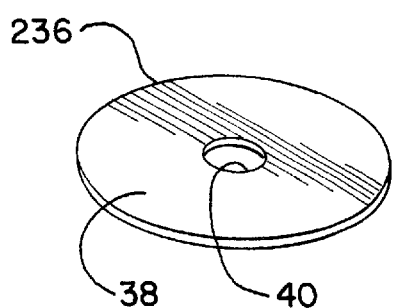
FIG. 11 is a top perspective view of a second alternative form of whistle insert.
Figure 12:
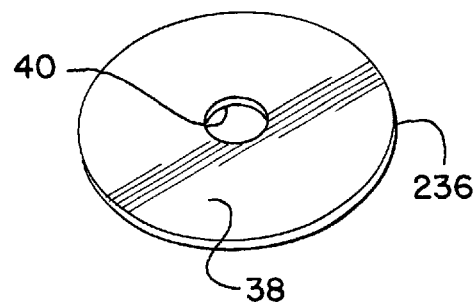
FIG. 12 is a bottom perspective view of the whistle insert of FIG. 11.

FIGS. 1 and 2 illustrate a tea kettle main body portion 10 for holding tea and having a spout 12 for pouring the tea out of the kettle. It will be appreciated that this is only an illustration of one possible type of kettle which can be used for incorporation of the whistle construction of the invention. Many options are available with respect to the shape of the body and with respect to the design of covers and handles adapted to be used in association with a tea kettle.

The tea kettle whistle design of the invention includes a pivoting top 14 normally closing the end of the spout. The top defines central opening 16 through which steam will pass to create the "whistle" in the usual fashion. A thumb engaging extension 18 is provided for pivoting the top about the axis defined by the aligned openings 20 formed in the opposed downwardly extending side walls 22 defined by this extension.

The top is attached to the base 24 which defines an upwardly formed fitting 26 receivable between the side walls 22 of the top extension. A passage 28 is defined by this fitting for alignment with the openings 20 and a pin 30 is receivable therein for securing the parts together in a hinged relationship. The pin is preferably made of the same plastic material as the base 24 and of slightly greater diameter than the passage 28 so that it can be press fit into the passage and retained therein without being loosened under the influence of heat. The pin diameter relative to the openings 20 will be such that the desired pivoting movement is readily obtained.

The base 24 defines an annular wall 32 dimensioned to receive the annular wall portion 34 formed around the bottom edge of the top 14. This provides a snug and aesthetically pleasing closure of the spout as best shown in FIGS. 2 and 3. Any suitable plastic, for example, a phenolic, may by employed for molding these components to mutually suitable dimensions and for providing the desired color for these tea kettle components.

The insert 36, best shown in FIG. 5, is preferably made of stainless steel. This insert includes a disc portion 38 defining hole 40 which is adapted to be aligned with the central opening 16 of the top 14 whereby steam issuing from the spout will pass through the aligned openings to produce the whistle sound. The disc portion has a diameter corresponding to inner diameter of wall portion 34 and protrusion 41 combined with shelf 43 combine to precisely locate the disc portion without the need for additional parts.

A spring portion including upwardly formed section 42 and outwardly formed section 44 is formed integrally with the disc portion. As shown in FIGS. 3 and 4 the section 44 is received between the top surface of fitting 26 and the underside of the extension 18. To achieve this, the section 44 must be bent to a position at essentially a right angle to the section 42 which places the spring portion under tension thereby normally urging the top to the closed position of FIG. 3. This is achieved because, as shown in FIG. 5, the section 44 is normally at an acute angle with respect to the section 42.

The base 24 also includes a shank portion 46 receivable within the spout 12 of the tea kettle. In the embodiment shown, the shank defines annular grooves 48 which receive O-rings 50 to insure a sealing relationship of the shank with the interior wall surface of the spout. In an alternative form of the invention, a silicone adhesive or the like may be employed in lieu of this O-ring arrangement.

FIGS. 6–10 illustrate an alternative form of the invention wherein like components are identified with the same reference numerals. The insert 136 in this embodiment also includes disc portion 38 with hole 40, and a spring portion formed of upwardly extending section 142 and outwardly formed section 144. The latter section includes a tab 148 which normally extends at an acute angle relative to the section 142. Opposed upper wall surfaces 150 are adapted to be located in engagement with the bottom wall surface of the extension 18 of top 16. As with the earlier described embodiment, when the insert 136 is in position, the spring tab 148 is placed under tension to normally urge the top to the closed position.

Figure 13:
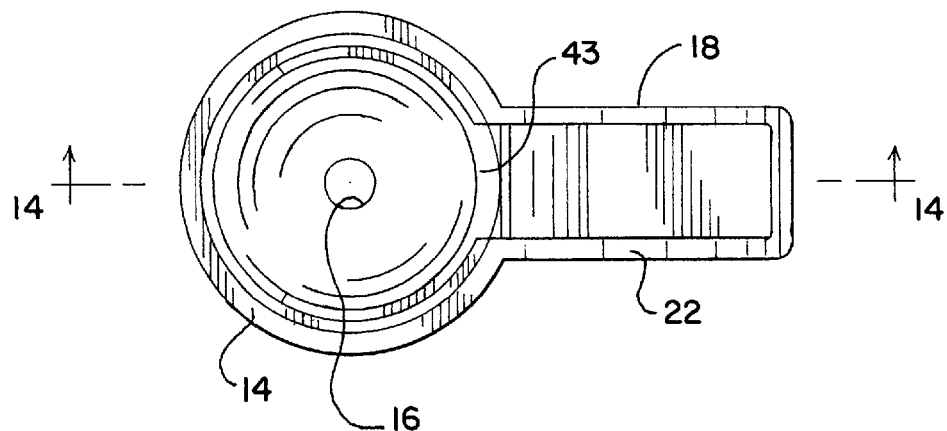
FIG. 13 is a bottom plan view of a whistle top suitable for use with the whistle insert of FIGS. 11 and 12; and, FIG. 14 is a cross-sectional view of the whistle top of FIG. 13 taken about line 14—14.
Figure 14:
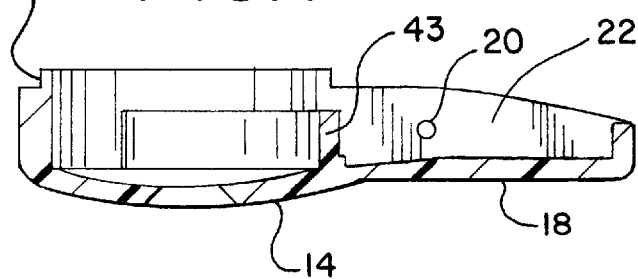

FIGS. 11–14 illustrate a second alternative form of the invention wherein like components are identified with the same reference numerals. The insert 236 in this embodiment also includes disc portion 38 with hole 40 but no spring portion formed of upwardly extending and outwardly formed sections as featured by the previous embodiments. Rather, the insert 236 is sized so that an interference fit exists when it is placed within the top 14 and positioned adjacent to shelf 43. As a result, as illustrated in FIGS. 13 and 14, the top may be constructed without the protrusion 41 shown in FIGS. 8 and 9.

In view of the relatively few and non-complex parts of the described structure, economical and efficient tea kettle whistle performance is achieved with the described combinations. It will be understood that various changes and modifications may be made in such structures without departing from the spirit of the invention particularly as described in the following claims.

That which is claimed is:

1. A tea kettle comprising a body portion for holding tea and a spout for pouring the tea from the kettle, said tea kettle having a whistle associated therewith, said whistle including a base defining a depending shank for insertion in said spout and a wall portion formed at the end of said shank and extending outwardly of the spout, said shank and said wall portion defining communicating passages whereby tea poured from the kettle passes through the base, a fitting formed on said wall portion and extending laterally therefrom, a top including a portion for interfitting with said wall portion of said base for opening and closing said passages, said top defining an opening, an extension on said top pivotally connected to said fitting for opening communication with said passages, and an insert defining an opening, said insert secured within said top without the use of additional parts and so that the openings of said insert and said top are in alignment for passage of steam generated in said body portion to achieve a whistling effect.

2. The tea kettle of claim 1 wherein said insert includes a spring member extending between said extension and said fitting, said insert normally holding said top in the position where it is interfitting with said wall portion.

3. A tea kettle according to claim 2 wherein said spring member of said insert comprises and upward portion extending upwardly from said insert, a spring tab normally positioned at an acute angle with said upward portion, said spring tab being bent to a position approximating a right angle relative to said upward portion when extending between said extension and said fitting whereby the spring tab is held under tension to normally hold said top in the position interfitting with said wall portion.

4. A tea kettle according to claim 2 wherein said spring member is made of stainless steel and said top and said fitting are plastic molded parts.

5. A tea kettle according to claim 1 including means for sealing the outer surface of said base with respect to the inside surface of said spout.

6. A tea kettle according to claim 1 wherein said insert is secured within said top by an interference fit.

7. A tea kettle comprising a body portion for holding tea and a spout for pouring the tea from the kettle, said tea kettle having a whistle associated therewith, said whistle including a base defining a depending shank for insertion in said spout and a wall portion formed at the end of said shank and extending outwardly of the spout, said shank and said wall portion defining communicating passages whereby tea poured from the kettle passes through the base, a fitting formed on said wall portion and extending laterally therefrom, a top including a portion for interfitting with said wall portion of said base for opening and closing said passages, said top defining an opening for passage of steam generated in said body portion to achieve a whistling effect, an extension on said top pivotally connected to said fitting for opening communication with said passages, and an insert including a spring member extending between said extension and said fitting, said insert normally holding said top in the position where it is interfitting with said wall portion.

8. A tea kettle according to claim 7 wherein said insert includes a disc portion positioned under said opening in said top, said disc portion defining an opening in alignment with said opening in said top for passage of steam therethrough.

9. A tea kettle according to claim 7 wherein said spring member of said insert comprises an upward portion extending upwardly from said insert, a spring tab normally positioned at an acute angle with said upward portion, said spring tab being bent to a position approximating a right angle relative to said upward portion when extending between said extension and said fitting whereby the spring tab is held under tension to normally hold said top in the position interfitting with said wall portion.

10. A tea kettle according to claim 7 wherein said spring member is made of stainless steel and said top and said fitting are plastic molded parts.

11. A tea kettle according to claim 7 including means for sealing the outer surface of said base with respect to the inside surface of said spout.

* * * * *